United States Patent [19]

Surprenant

[11] 4,277,655
[45] Jul. 7, 1981

[54] AUTOMATIC GAIN REPEATER

[75] Inventor: Ronald J. Surprenant, Anaheim, Calif.

[73] Assignee: Lear Siegler, Inc., Santa Monica, Calif.

[21] Appl. No.: 951,335

[22] Filed: Oct. 16, 1978

[51] Int. Cl.³ .............................................. H04B 3/36
[52] U.S. Cl. ................................ 179/170 R; 179/16 F
[58] Field of Search ..................... 197/1 A, 16 F, 81 B, 179/170 R, 170 D, 170 J; 363/80

[56] References Cited

U.S. PATENT DOCUMENTS

| | | | |
|---|---|---|---|
| 2,282,465 | 5/1942 | Edwards | 179/170 D |
| 3,215,788 | 11/1965 | Oswald | 179/170 D |
| 3,660,609 | 5/1972 | Tremblay et al. | 179/16 F |
| 3,778,563 | 12/1973 | Bise et al. | 179/170 D |
| 3,855,431 | 12/1974 | Stewart | 179/170 R |
| 3,872,266 | 3/1975 | Baxter, Jr. | 179/170 R |
| 3,903,378 | 9/1975 | Lee et al. | 179/170 R |
| 3,911,372 | 10/1975 | Seidel | 179/170 R |
| 3,914,560 | 10/1975 | Greene | 179/170 R |
| 3,932,712 | 1/1976 | Suntop | 179/170 R |
| 4,007,340 | 2/1977 | Russell | 179/170 R |
| 4,049,928 | 9/1977 | Levi | 179/16 F |
| 4,150,260 | 4/1979 | Kamata | 179/170 D |

Primary Examiner—Bernard Konick
Assistant Examiner—Randall P. Myers
Attorney, Agent, or Firm—Christie, Parker & Hale

[57] ABSTRACT

An automatic gain repeater for varying the amplification of AC signals transmitted through a telephone subscriber loop in accordance with the impedance of such subscriber loop is described. The automatic gain control circuitry includes controllable variable gain amplifiers connected in series circuit arrangement with the subscriber loop. The gain of the amplifiers is varied, in a continuous manner, in accordance with the subscriber loop line impedance such that the overall transmission line loss is a constant predetermined value. Gain of the amplifiers is accomplished by means of a control signal generated in a loop extender circuit that is coupled to the subscriber loop.

Impedance networks coupled to gain repeater hybrid transformers provide minimum operating power loss with maximum power transfer between the automatic gain repeater circuit and subscriber loop while maintaining adequate transhybrid loss between the two directions of transmission and matching input impedance.

13 Claims, 4 Drawing Figures

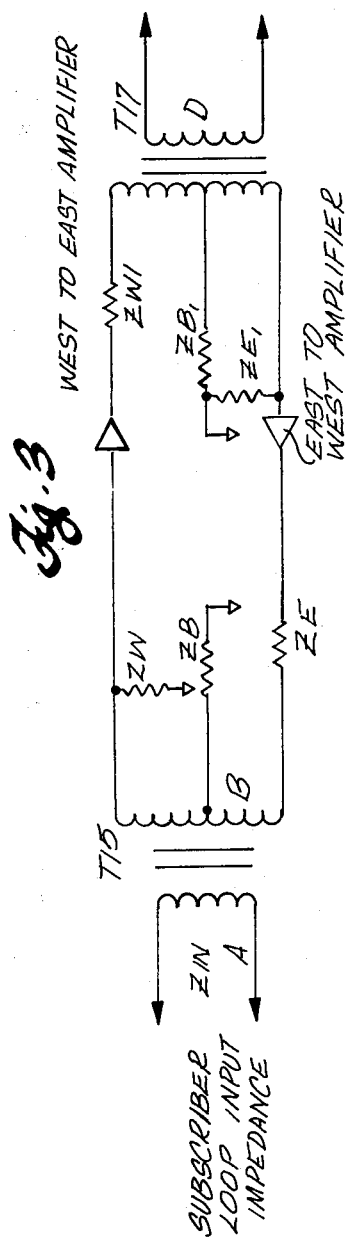

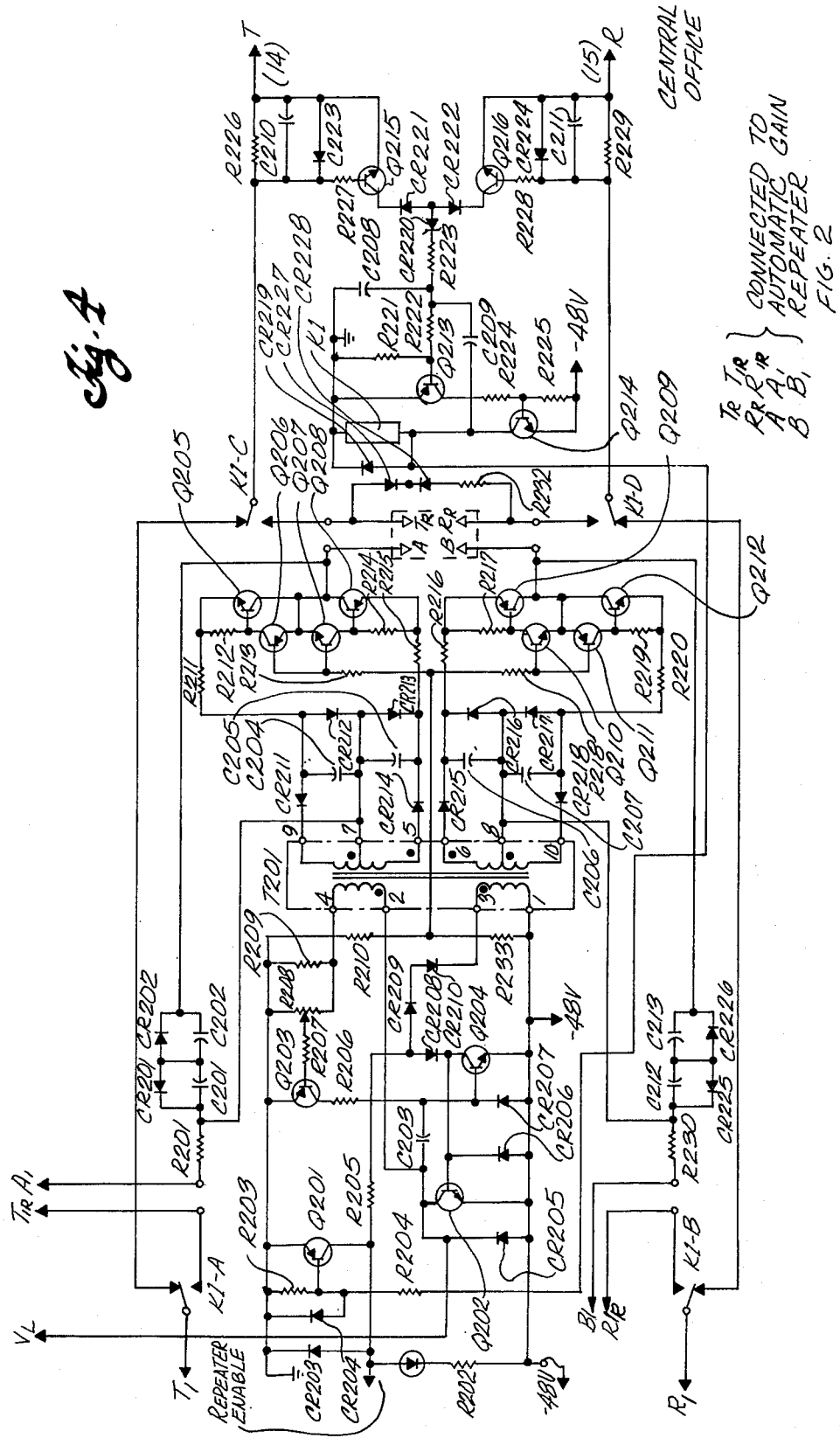

AUTOMATIC GAIN REPEATER

BACKGROUND OF THE INVENTION

1. Field of the Invention

This application relates to an automatic gain repeater and more particularly to a gain repeater that includes controllable variable gain amplifiers in series circuit connection with a subscriber loop to maintain constant subscriber loop line loss independent of line lengths.

2. Description of the Prior Art

Automatic gain repeaters are known in the prior art. One type of repeater is described in U.S. Pat. No. 4,049,928 issued to Levi. Operation of the described repeater relies on determining loop resistance by applying a constant current in the subscriber loop. A deficiency of repeaters of this design resides in the fact that they require a well-regulated constant current source and a feedback circuit for voltage control of the gain. Feedback controllers of this type are of marginal stability and require sophisticated stabilizing filter networks. Monitoring of the current and control of the repeater amplifiers thus requires addition of circuitry which ultimately adds to both the cost and complexity of the unit. Another deficiency is the inability of this design to differentiate between changes in loop current due to loop length as opposed to those due to changes in the battery feed voltage.

Another such repeater is described in U.S. Pat. No. 4,056,688 issued to Stiefel. Operation of the described repeater relies, again, upon the measurement of current in the subscriber loop to determine its resistance and the amount of gain required to maintain a constant transmission signal level.

A feature of the described device is that the gain change occurs in quantized discrete steps. Thus, noticeable volume differentials occur between users where a gain change occurs intermediate between the two user stations.

Another such repeater is described in U.S. Pat. No. 4,061,883 to Chambers. This approach requires the simultaneous measurement of both current and voltage to determine the loop resistance. This is in contrast to the present invention which requires no direct measurement of any line parameters. Chambers also requires the use of costly and complex four quadrant multiplier circuits to achieve its automatic gain control. Considerable power is also required by this design. Such power could better be used to provide current boost to the line as is done in the present invention. The device is also characterized by discrete gain changes with the effects as previously described above.

SUMMARY OF THE INVENTION

The present invention is directed towards an automatic gain repeater which achieves linear and continuous gain changes automatically to compensate for subscriber loop impedance changes. The repeater comprises a loop extender that generates a control signal as a function of subscriber loop impedance. A variable controllable gain amplifier responsive to the control signal is connected in series circuit arrangement in the subscriber to central office line. Similarly, a variable controllable gain amplifier responsive to the control signal is connected in series circuit arrangement in the central office to subscriber line.

The loop extender provides a control signal to the variable gain amplifiers in accordance with the impedance of the subscriber loop so that constant power is applied to such subscriber loops. Additionally, for the herein described invention, no line current or voltage measurements are required in order to achieve proper gain repeater operation.

Constant power within the subscriber loop is generated in the loop extender by means of a fly-back DC to DC converter circuit that is operated at a fixed energy level and is coupled to the subscriber and central office line. As the subscriber loop impedance changes, the constant power feature gives rise to a control signal (voltage) from the converter which varies in accordance with such impedance changes. The controllable variable gain amplifiers, which are set to establish an initial 4 DB subscriber loop loss, are controlled by the control signal such that a constant 4 DB line loss is achieved over the expected range of subscriber loop impedances.

The loop extender circuit, that monitors the subscriber loop line impedance value, is connected in a feed-forward arrangement with respect to the automatic gain repeater rather than in a feedback arrangement, thereby eliminating feedback oscillation phenomena characteristic of the prior art devices.

The linear and continuous gain variation in the variable gain amplifiers is accomplished by means of adjustment of the bias on zener diodes that are connected in a feedback impedance arrangement across operational amplifiers that comprise the variable gain amplifiers. Operation of feedback zener diode is established in the vicinity of the reverse bias knee of its characteristic I-V curve. The equivalent impedance of the zener diode, which influences the overall gain of the amplifier, is varied by the control signal by driving the zener diode further into or out of full breakdown dependent upon subscriber loop conditions. The amplifier gain is increased for the case of high loop impedances and correspondingly lowered for the case of low loop impedances.

Another feature of the repeater is its isolation by means of compensation circuitry from variances and disturbances in power supply voltages. Thus, changes in supply voltage, which effect the control voltage from the loop extender inverter, are compensated for in the gain repeater, thus eliminating gain changes resulting from supply fluctuations.

Still another feature of the gain repeater resides in the impedance networks that are coupled to the subscriber loop and central office transformers. The output impedances in the West-East and East-West lines have been eliminated, thereby avoiding the typical 6 DB power loss across such impedances. Thus, the overall operating power requirements of the gain repeater is reduced correspondingly, and use may be made of lower-priced, commercially available amplifiers having lower power capacity.

BRIEF DESCRIPTION OF THE DRAWINGS

FIG. 3 is a circuit diagram of matching impedance network connections.

FIG. 4 is a detailed schematic of the loop extender.

DETAILED DESCRIPTION

Figure 1:
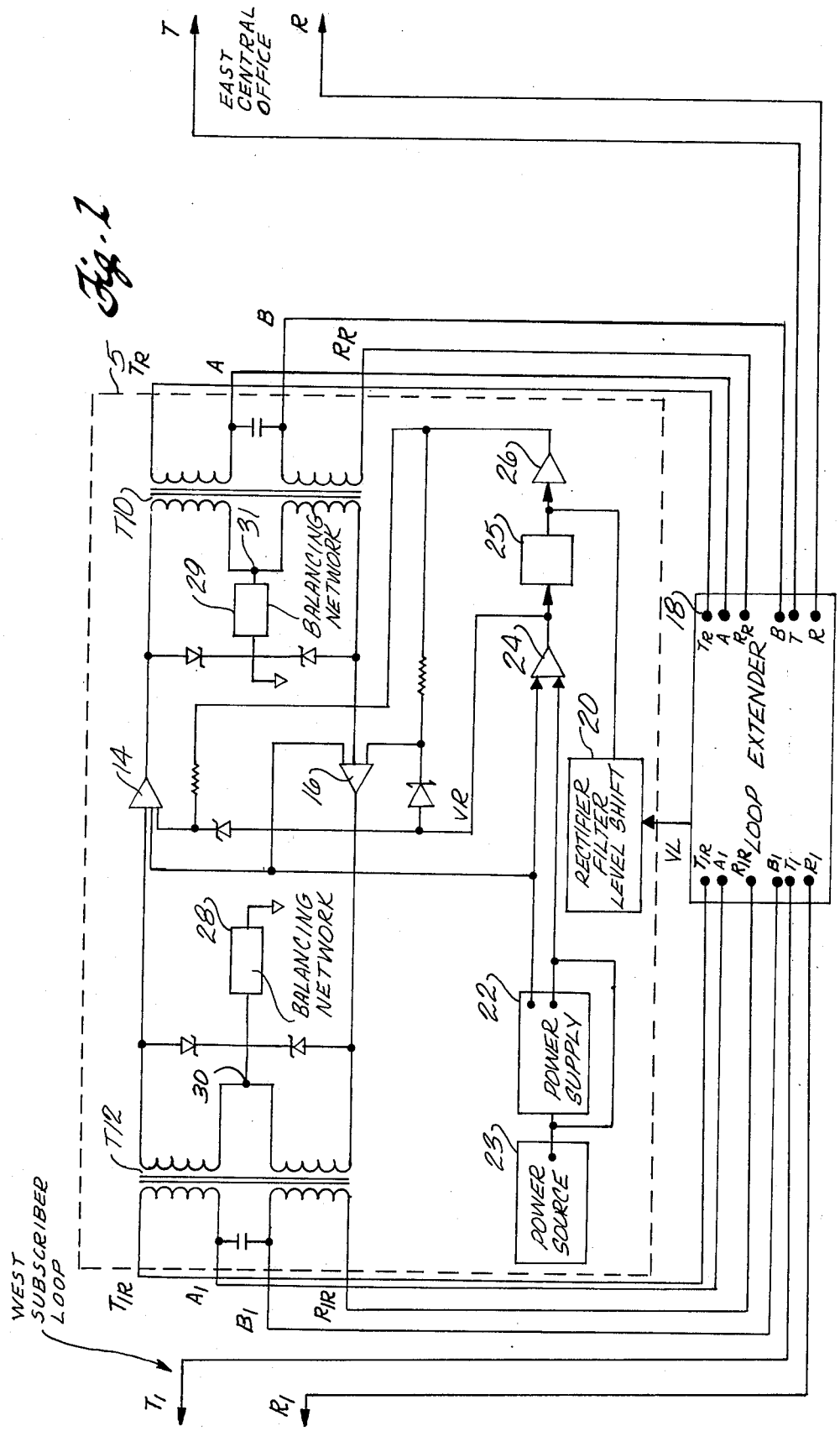
FIG. 1 is an overall block diagram of an automatic gain repeater coupled to a loop extender.

Referring more particularly to FIG. 1, there is shown in block diagram an automatic gain repeater (AGR) 5 connected to a telephone subscriber loop between the telephone central office lines T and R, and subscriber loop lines T1 and R1. Hybrid transformer T10 provides coupling between the AGR 5 and the central office while transformer T12 provides coupling between the AGR 5 and the subscriber loop. Controllable variable gain amplifiers 14 and 16 are connected in series circuit arrangement between hybrid transformers T10 and T12 to provide the telephone signal amplification requirement of the AGR 5.

Control of amplifiers 14 and 16 is accomplished by means of an impedance detecting circuit in loop extender 18. The loop extender 18 is connected to the central office side of hybrid transformer T10 and to the subscriber side of hybrid transformer T12.

The loop extender 18 has an inverter circuit whose output voltage, VL, is a function of the impedance presently existing in the subscriber loop. As described infra, VL is a square wave amplitude modulated signal having a frequency in the range of about 25 to 35 KHZ. The control signal VL, which is a function of subscriber loop impedance, is half wave rectified, level shifted, filtered in filter 20 and then applied to buffer amplifier 26. Filter 20, which acts as a controlled time constant filter, includes a fast attack, slow decay time, low pass filter which increases the stability margin of amplifier 26 during transient intervals of operation by permitting rapid decreases in gain but slow increases in gain. The output of filter 20 is connected to the input of buffer 26 whose output is applied to series controllable variable gain amplifiers 14 and 16 in such a manner that the line loss in the subscriber loop will be maintained constant and independent of the impedance variations in the subscriber loop. The 31 48 V master supply 23 and the 27 V amplifier power supply 22 are compared with regard to their respective output voltages in amplifier 24. Amplifier 24 generates an output reference voltage which varies in accordance with changes in the output voltage of master supply 23 such that the amplifiers 14 and 16 variable gain elements are unaffected by such voltage fluctuations.

The audio gain, as controlled by amplifiers 14 and 16, is varied, so that, at line impedances in the range of 1000 to 3000 ohms, the line loss will be a constant 4 DB. Thus, overall line loss is independent of line length since amplifier gain increases to compensate for impedance loss and audio response over subscriber lines of varying length is maintained constant.

For hybrid transformer applications, balancing impedances are coupled to the transformer coils to maintain adequate transhybrid loss within the frequency range of telephone operations. This invention is addition utilizes these balancing impedances to determine the input impedances to the West and East sides of the automatic gain repeater. Thus, network 28, connected to the center tap terminal 30 of transformer T12, is configured to match the impedance in the subscriber loop. Similarly, network 29, connected to the center tap terminal 31 of transformer T10, is configured to match the impedance of the central office line.

Figure 2:
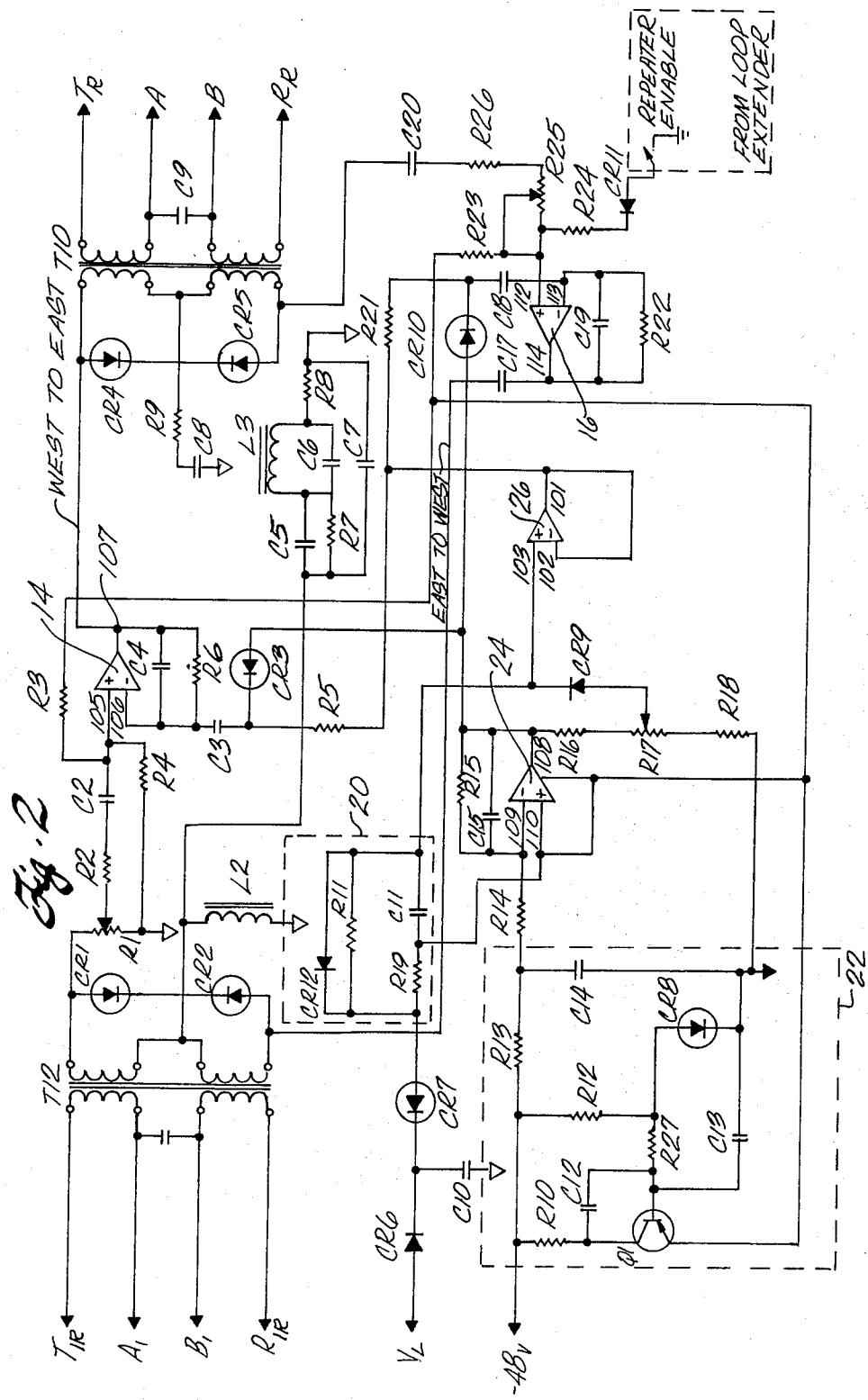
FIG. 2 is a detailed schematic diagram of the automatic gain repeater.

Referring now to FIG. 2, there is shown in detail the presently preferred embodiment of the herein described invention. Transformer T10, connected in a center tapped hybrid arrangement, couples the telephone central office to the AGR 5 while transformer T12, also connected in a center tapped hybrid arrangement, couples the telephone subscriber loop to the AGR 5.

The circuit that maintains subscriber loop loss constant and independent of subscriber loop impedance variations includes operational amplifiers 14 and 16.

Amplifier 14 is a conventional high gain operational amplifier having a noninverting input terminal 105 and an inverting input terminal 106 and an output terminal 107. Coupled to the noninverting input terminal is an input circuit comprising resistors R1, R2, R3 and R4 and capacitor C2. Resistor R1 is a potentiometer connected between the AGR 5 side of transformer T12 and ground. The arm of R1 is connected to the noninverting input terminal 105 of amplifier 14 through series connected input resistor R2 and DC isolation capacitor C2. The arm of potentiometer R1 is used to establish an overall West-East (subscriber to central office) line loss and for the present embodiment, the arm is set to keep the net line loss in the range of about 4 DB. R3 and R4 are connected to the power supply 22, to establish an operating voltage bias on amplifier 14. Capacitor C4 is selected to inhibit high frequency noise amplification through amplifier 14 and for the present embodiment, capacitor C4 is set to achieve 1 DB of attenuation at a frequency of about 3 KHZ.

Coupled to the inverting input terminal 106 of amplifier 14 is a feedback circuit comprising resistor R6, capacitors C3 and C4, and zener diode CR3. Zener diode CR3 is biased by the output of unity gain buffer amplifier 26 (discussed infra), such that the diode's operating point is in the vicinity of the knee of its I-V characteristic curve. The impedance of the zener diode CR3, which is a function of the slope of the I-V curve, can be varied by control of the diodes' bias along its characteristic curve. Thus, the impedance changes, which occur in amplifier 14 feedback circuit, provide amplifier gain adjustment in accordance with the bias on the zener diode CR3. The anode side of zener diode CR3 is connected to the output of amplifier 24 (discussed infra). Amplifier 24 serves to bias the zener diode CR3 so that the overall AGR 5 gain will be independent of the voltage fluctuations of the AGR 5 master supply 23.

The cathode side of CR3 is connected to the output of amplifier 26 through current limiting bias resistor R5. The bias point, set by amplifier 24, results in operation of the zener diode CR3 having an equivalent resistance in the range of between 1 to 3 kilohms. The input of amplifier 26 is connected to the output of the loop extender 18 (FIG. 4) through series filter 20, level shift zener diode CR7, and series rectifying diode CR6.

Amplifier 26, connected in a unity gain configuration, serves to adjust the bias on zener diode CR3 in accordance with the level shifted output from the loop extender 18. The change in zener diode CR3 bias, which results in a corresponding resistance change of CR3, is used to vary the gain of amplifier 14 which in turn ultimately varies the gain of the AGR 5. Thus, any impedance changes detected by the loop extender 18 manifest a corresponding compensating change in AGR 5 gain.

The variable controllable gain of the AGR 5 is continuous in nature in that the gain of the amplifier varies continuously with regard to subscriber loop impedance. The AGR 5 gain is controlled so as to maintain the subscriber line loss at a constant 4 DB level for line impedances that range from 1 to 3 kilohms. For any subscriber line resistance, therefore, the overall loss is independent of line length since amplifier gain varies linearly to compensate for line impedance variations. Additionally, since the gain is varied linearly and continuously rather than discretely, as in conventional repeater amplifiers, there is no distinct loudness changes in the transmitted signals along the subscriber line when line impedance values causing discrete gain changes fall between two subscriber stations.

A similar gain function for the East-West (central office to subscriber loop) line is provided by amplifier 16. Amplifier 16 is a conventional high gain operational amplifier having noninverting terminal 112, an inverting input terminal 113 and an output terminal 114. Coupled to the noninverting input terminal 112, is an input circuit comprising resistors R23, R24, R25, and R26 capacitor C20 and diode CR11.

Resistors R23 and R24 serve to bias amplifier 16 in the middle of its operating range when a repeater enable command is initiated by the loop extender 18. During the time when the repeater enable command is not present, amplifier 16 is saturated having an output voltage equal to the main power source value. Thus, no amplification is provided unless the repeater is enabled.

Enabling is initiated when an "offhook" condition is detected by the loop extender 18.

The AGR 5 side of transformer T10 is AC coupled to the noninverting input terminal 112 of amplifier 16 by means of series blocking capacitor C20 and series resistors R26 and R25. Resistor R25 is connected in a rheostat configuration to provide initial gain adjustment to maintain an overall subscriber loop loss at 4 DB (West-East direction).

The feedback resistor R22 sets the overall gain of the amplifier and in conjunction with C19 provides high frequency noise signal attenuation. In the preferred embodiment, the element values of R22 and C19 are selected to provide 1 DB of attenuation at about 3 KHZ.

Capacitor C17 provides DC isolation between the output of amplifier 16 and transformer T12 while capacitor C18 provides DC isolation between the zener diode CR10 bias network and the inverting input terminal 113 of amplifier 16. Zener diode CR10 provides variable feedback impedance indentical in nature to that discussed with reference to zener diode CR3.

Loop extender 18 is a DC to DC converter whose output voltage VL is a function of the subscriber loop impedance. The loop extender 18 output voltage at terminal VL is an amplitude modulated signal having a frequency in the range of 25 to 35 KHZ that is applied to the anode of rectifying diode CR6. Capacitor C10 serves as a filter capacitor so that a DC signal proportional to subscriber loop impedance appears at the cathode of CR6. Zener diode CR7 serves as a level shifter to provide a signal from the loop extender 18 within the voltage operating range of amplifiers 24 and 26.

Filter 20 comprises resistors R19 and R11, capacitor C11 and diode CR12. The filter 20 serves to minimize AGR 5 oscillations by increasing the AGR 5 loop gain at a slower rate in response to subscriber loop impedance changes than if a direct connection existed between the loop extender 18 and amplifiers 24 and 26. The inclusion of diode CR12 results in unsymmetrical operation of filter 20 such that as the subscriber loop suddenly increases in length the AGR 5 gain is increased slower than it is reduced when the subscriber loop is suddenly shortened.

Rapid subscriber loop impedance changes occur, when for example, a subscriber loop is switched from one line to another or when a subscriber undertakes the dialing process. During such times, the voltage output, VL, from the loop extender 18, would increase very rapidly and attempt to attain a level in the range of the voltage limits of the loop extender 18. Thus, from an initial idle state condition to turn-on, as in the case of removal of the telephone handpiece from the telephone, the AGR 5 cannot, because of filter 20, commence operation in a high gain mode. Any possibility of oscillation is therefore prevented since the AGR 5 comes on initially in a low gain mode. The time constant of filter 20 is in the range of about 0.5 seconds which insures that the gain increase of the AGR 5 builds at a controlled rate.

The repeater enable level is removed during all idle states. Under such conditions, the operating current of the AGR 5 is about 1 milliampere during idle and about 100 milliamperes when in the active mode.

Power supply 22, that provides bias voltages to amplifiers 14, 16 and 24, includes voltage regulating transistor Q1 and reference voltage zener diode CR8. The collector of transistor Q1 is connected to the −48 V master supply 23 through resistor R10. To the base of transistor Q1 is connected through base resistor R27 the common connection point of current biasing resistor R12 and the anode of zener diode CR8. The emitter of transistor Q1 is connected to the noninverting terminal 105 of amplifier 14 through series resistor R3 as well as to the noninverting terminal 112 of amplifier 16 through series resistor R23. Additionally, the emitter of transistor Q1 is connected directly to the noninverting terminal 110 of amplifier 24. The voltage at the emitter of Q1 is essentially that of the breakdown voltage of zener diode CR8, and is maintained constant independent of variations on the −48 V master supply 23. Thus, a constant biasing voltage for amplifiers 14, 16 and 24 independent of any fluctuations in the −48 V master supply 23 is obtained.

Amplifier 24 is a conventional operational amplifier having an inverting input terminal 109, a noninverting input terminal 110, and an output terminal 108. Connected between the output terminal 108 and the inverting input terminal 109 is a feedback network comprising resistor R15 and capacitor C15. Also connected to the inverting input terminal 109 is the −48 V master supply 23 through the series connection of resistors R13 and R14. Connected to the noninverting terminal 110 is the output of the regulated voltage source 22. Amplifier 24 serves as a voltage reference source for the anode side of zener diodes CR3 and CR10. Since the inverting terminal 109 of amplifier 24 is connected through resistors R13 and R14 to the −48 V master supply 23, the output of amplifier 24 will vary in accordance with any voltage changes in power source 23 and therefore alter the bias voltage at the anode of CR3 and CR10 accordingly. Consequently, voltage variations in loop extender 18 output voltage, due to fluctuations in power source 23 voltage, will be automatically compensated by the corresponding change in zener diodes CR3 and CR10 biasing voltages.

Buffer amplifier 26 is a conventional operational amplifier having an output terminal 101 connected directly to its inverting input terminal 102 resulting in an overall amplifier gain of unity. The noninverting input terminal 103 is coupled to the output of the loop extender 18 through filter 20, zener diode CR7 and diode CR6. The voltage at the output terminal 101 of amplifier 26 will change in accordance with the voltage variations at the output of the impedance detector 18 and adjust the gain of amplifiers 14 and 16 by means of adjusting the operating point, as previously discussed, of diodes CR3 and CR10 respectively.

Connected to the output of amplifier 24, in series circuit arrangement, are resistor R16, potentiometer R17 and resistor R18. Connected to the noninverting input terminal 103 of amplifier 26 is the arm of potentiometer R17 through diode CR9.

The arm of potentiometer R17 is set to limit the minimum gain of amplifiers 14 and 16 to a predetermined value and in the preferred embodiment to 0 DB. Thus, as the sensed voltage at the noninverting input terminal 103 of amplifier 26, due to low subscriber loop impedance, falls below the anode potential of CR9, the input voltage at terminal 103, and therefore, the output voltage at terminal 101, will remain fixed. The loop length at which the 0 DB gain controls becomes effective is determined by the selected maximum subscriber loop loss desired and which in the present embodiment is selected at 4 DB.

Balance network 28 comprising resistors R7 and R8, capacitors C5, C6 and C7, and inductors L2 and L3 are connected to the center tap of transformer T12.

The values of the network 28 components are selected to match the impedance existing in the subscriber loop. The technique for placement of the network at the center tap terminal 30 and selection of component values is better understood by use of the circuit diagram shown in FIG. 3.

In a typical arrangement, as shown in FIG. 3, the network impedances for impedances $Z_W$ and $Z_E$ are selected to maximize the power transfer from the East-West amplifier to the subscriber loop and to determine the input impedance of the automatic gain repeater. Additionally, the network impedance $Z_B$ is selected to minimize the transfer of the output signal of the East-West amplifier to the input of the West-East amplifier, thus, minimizing cross-talk and interference between the East-West and West-East amplifiers.

Typically, there is a 6 DB power loss at the output of the East-West amplifier due to the loss across series impedance $Z_E$. Similarly, there is a power loss across series impedance $Z_{W1}$. Such power loss may be avoided by connecting the outputs of the East-West and West-East amplifiers directly to the corresponding windings of transformers T15 and T17 respectively, thereby making $Z_E$ and $Z_{W1}$ equal to zero.

The resulting expression for the input impedance $Z_{IN}$ becomes:

$$Z_{IN} = \frac{Z_B \cdot Z_{W/4}}{Z_B + Z_{W/4}}$$

Thus, if the input impedance $Z_W$ is made large compared to $Z_B$, proper automatic gain repeater to subscriber line matching is accomplished by configuring $Z_B$ to match the impedance of the subscriber loop which is an existing requirement to insure adequate transhybrid balance.

In a similar manner, the matching impedance network 29 is configured to match the impedance of the central office side of transformer T10 thereby avoiding any power loss due to insertion of a matching impedance between the output of the West-East amplifier and transformer T10.

Referring now to FIG. 4, there is shown in detail a loop extender 18 that responds to the impedance connected to subscriber lines $T_1$ and $R_1$ to generate a voltage VL (FIG. 1) in accordance with the detected subscriber loop impedance. The voltage at terminal VL is used as the basis to control the gain of the AGR 5 and reponds to changes in the subscriber loop impedance in order to maintain constant power delivery to the subscriber loop independent of such changes.

Terminals T and R of loop extender 18 are connected to the East central office. An "offhook" condition is sensed by either the circuit comprising transistor Q215, diodes CR223 and CR221, resistors R226 and R227 and capacitor C210 or by the circuit comprising transistor Q216, diodes CR222 and CR224, resistors R228 and R229 and capacitor C211.

At the instant of an "offhook" condition, either transistor Q215 or Q216 becomes conductive and relay K1 is energized by means of a relay drive circuit comprising transistors Q213, Q214, zener diode CR220, resistors R221, R222, R223, R224 and R225, and capacitors C208 and C209. Relay contacts K1-A, K1-B, K1-C and K1-D serve to interconnect the loop extender 18 into the subscriber loop when relay K1 is energized.

The loop extender 18 is essentially a fly-back DC static inverter having an operating frequency in the range of 25 to 35 KHZ. The oscillation circuit comprises essentially transistors Q201, Q202, Q203 and Q204, and the primary side windings connected to terminals 4-2 and 3-1 of transformer T201.

The secondary side of transformer T201 has two center tapped coil windings, each winding coupled to an identical complementary switch transistor circuit. The complementary switch circuit coupled to the secondary terminals 9, 7 and 5 of transformer T201 comprises diodes CR211, CR212, CR213 and CR214, transistors Q205, Q206, Q207 and Q208; resistors R211, R212, R213, R214 and R215, and capacitors C204 and C205.

The complementary switch circuit coupled to the secondary terminals 6, 8 and 10 of transformer T201 comprises diodes CR215, CR216, CR217 and CR218, transistors Q209, Q210, Q211 and Q212, resistors R216, R217, R218, R219, R220 and capacitors C206 and C207. The subscriber loop is connected across the center tap terminals 7 and 8 of transformer T201. The central office side of transformer T201 is coupled to the inputs T and R of the loop extender 18 from the collector of transistors Q208 and Q209 respectively.

Upon occurrence of an "offhook" condition, relay K1 is energized thereby applying the −48 V master supply 23 to transistor Q201 rendering it conductive. Base drive current for transistor Q202 is provided by transistor Q201 through series resistor R205 and diode CR208. The current in the primary winding between terminals 4-2 of transformer T201, increases at a rate determined by the inductance of the transformer winding between terminals 4-2. As the current in the transformer winding between terminals 4-2 increases, transistor Q203 tends to become conductive. At such time as transistor Q203 is rendered conductive, base current is supplied to transistor Q204 thereby rendering it conductive. As the current in the collector of transistor Q204 increases, base current is drawn away from transistor Q202 thereby turning it off. As transistor Q202 is rendered nonconductive, the current in transformer T201 primary coil between terminals 4-2 is reduced to zero. This causes the voltage across the primary coil between terminals 4-2 to begin reversing in polarity. A similar change occurs in the winding between terminals 3-1 which forward biases CR209 and CR210 further removing base current from transistor Q202. The voltages across the secondary coils between terminals 9-5 and 6-10 also change polarity causing diodes CR211, CR214, CR215 and CR218 to become biased. Forward biasing the diodes causes a symmetrical series-aiding boost voltage to be introduced in the subscriber loop between lines A and A1 and B and B1.

As shown in FIGS. 1 and 4, terminal A of T10 (see FIG. 1) is coupled in series circuit arrangement to terminal A1 of T12. The series circuit includes previously-described complementary transistor switches Q205-Q208, transformer T201, and resistor R201.

Depending upon the polarity of the central office line feed battery, either the T201 coil between terminal 9 and the center tap terminal 7 or terminal 5 and terminal 7 is included in the series circuit. The series-aiding boost voltage appears across terminals 7-5 and 7-9 of transformer T201. Also, as shown in FIGS. 1 and 4, terminal B of T10 (FIG. 1) is coupled in series circuit arrangement to terminal B1 of T12. The series circuit includes complementary transistor switches Q209-Q212, transformer T201 and resistor R230.

Depending upon the polarity of the central office line feed battery, either the T201 coil between terminal 6 and center tap terminal 8 or terminal 10 and terminal 8 is included in the series circuit. The series-aiding boost voltage appears across terminals 8-6 and 8-10 of T201. This condition remains until a fixed amount of energy generated in the primary coil between terminals 4-2, predetermined by the setting of resistor R208, is delivered to the secondary coils between terminals 9-5 and 6-10. Upon completion of such energy delivering, the voltage across primary coils between terminals 4-2 and 1-3 reverses such that diodes CR209 and CR210 are turned off allowing base current to be reapplied to transistor Q202 through resistor R205. At this time, transistors Q204 and Q203 are rendered nonconductive. Consequently, the collector current of transistor Q201 applies base drive to transistor Q202 rendering it conductive thereby repeating the oscillation process. The voltage appearing at the collector Q202 is a function of the subscriber loop impedance that is reflected into the primary coils of transformer T201. Thus, as the subscriber loop impedance that is connected to the secondary coils of transformer T201 increases resulting from different subscriber loop distances, the voltage appearing at the collector of transistor Q202 correspondingly increases. Thus, a measure of the impedance of the subscriber loop is obtained directly as a function of voltage appearing at the collector of transistor Q202. The transformer T201, coil between terminals 3-1, and series diodes CR209 and CR210 insure that oscillation will commence at start up.

While the basic principle of this invention has been herein illustrated, it will be appreciated by those skilled in the art that variations in the disclosed arrangement, both as to its details and as to the organization of such details, may be made without departing from the spirit and scope thereof. Accordingly, it is intended that the foregoing disclosure and the showings made in the drawings will be considered only as illustrative of the principles of the invention and not construed in a limiting sense.

What is claimed is:

1. An automatic gain repeater system for use in a telephone transmission line subscriber loop having a subscriber to central office line and a central office to subscriber line, the automatic gain repeater system comprising:
    means for connecting said automatic gain repeater system to a telephone central office;
    means for connecting said automatic gain repeater system to a telephone subscriber loop;
    a first variable controllable West-East amplifier means for amplifying telephone transmission in the subscriber to central office line;
    a second variable controllable East-West amplifier means for amplifying telephone transmission in the central office to subscriber line;
    means coupled to the central office line and to the subscriber line for delivering constant predetermined amount of power to the subscriber loop and producing thereby a signal in accordance with the subscriber loop impedance; and
    means for controlling the first and second amplifier means in accordance with the signal produced by the means for delivering constant predetermined amount of power to the subscriber loops such that the transmission loss in the subscriber loop is maintained at a predetermined level.

2. The automatic gain repeater according to claim 1 wherein the first amplifier means is a controllable variable gain AC amplifier connected in series circuit arrangement with the subscriber to central office line and the second amplifier means is a controllable variable gain AC amplifier connected in series circuit arrangement with the central office to subscriber line.

3. The automatic gain repeater according to claim 2 wherein the generated signal varies the gain of the AC amplifiers in accordance with the subscriber loop impedance so that the line loss in the subscriber loop is maintained at a predetermined value.

4. The automatic gain repeater according to claim 3 wherein the predetermined value is 4 DB.

5. The automatic gain repeater system according to claim 1 further comprising:
    a first transformer in a hybrid connection arrangement, said first transformer having two primary winding terminals and a primary center tap terminal, the output of the West-East amplifier means coupled directly to one primary terminal, the input circuit of East-West amplifier means coupled to the other primary terminal and an impedance matching network connected to the center tap terminal, said network configured to match the central office line impedance as reflected into the primary side of the transformer; and
    a second transformer in a hybrid connection arrangement, said second transformer having two primary winding terminals and a primary center tap terminal, the output of the East-West amplifier means coupled directly to one primary terminal, the input circuit of West-East amplifier means coupled to the other primary terminal and an impedance matching network connected to the center tap terminal, said network configured to match the subscriber line impedance as reflected into the primary side of the transformer.

6. An automatic gain repeater system for use in a telephone transmission line subscriber loop having a subscriber to central office line and a central office to subscriber line, the automatic gain repeater system comprising:

means for connecting said automatic gain repeater system to a telephone central office;

means for connecting said automatic gain repeater system to a telephone subscriber loop;

a first controllable variable gain AC amplifier connected in series circuit arrangement with the subscriber to the central office line for amplifying telephone transmission in the subscriber to central office line, a second controllable variable gain AC amplifier connected in series circuit arrangement with the central office to subscriber line for amplifying telephone transmission in the central office to subscriber line, each of said variable controllable AC amplifiers further comprising a high gain operational amplifier having an inverting input terminal, a noninverting input terminal, an output terminal, an input circuit connected to the noninverting terminal, a variable impedance feedback circuit coupled between the output terminal and the inverting terminal;

a variable impedance connected between the inverting terminal and ground;

means, coupled to the central office line and to the subscriber line, for delivering constant predetermined amount of power to the subscriber loop and producing thereby a signal in accordance with the subscriber loop impedance; and means for controlling the first and second controllable variable gain AC amplifiers in accordance with the signal produced by the means for delivering constant predetermined amount of power to the subscriber loop such that the transmission loss in the subscriber loop is maintained at a predetermined level.

7. The automatic gain repeater system according to claim 6 wherein the variable impedance feedback circuit further comprises:

a fixed resistor connected between the output terminal and the inverting terminal;

a zener diode coupled to the inverting terminal; and a variable bias supply coupled to the zener diode to bias the zener diode through its breakdown region thereby changing the impedance of the zener diode in accordance with the variable bias supply.

8. The automatic gain repeater system according to claim 7 wherein the variable bias supply is coupled to the means for delivering constant predetermined amount of power whereby the variable bias supply is varied in accordance with the impedance in the subscriber loop so that the transmission loss in the subscriber loop is maintained at a predetermined level.

9. The automatic gain repeater system according to claim 8 wherein the means for connecting the automatic gain repeater to the central office further comprises, a transformer in a hybrid connection arrangement, said transformer having two primary winding terminals and a primary center tap terminal, the output of the West-East amplifier coupled directly to one primary terminal, the input circuit of East-West amplifier coupled to the other primary terminal and an impedance matching network connected to the center tap terminal, said network configured to match the central office line impedance as reflected into the primary side of the transformer.

10. The automatic gain repeater system according to claim 7 wherein the means for connecting the automatic gain repeater to the subscriber loop further comprises, a transformer in a hybrid connection arrangement, said transformer having two primary winding terminals and a primary center tap terminal, the output of the East-West amplifier coupled directly to one primary terminal, the input circuit of West-East amplifier coupled to the other primary terminal and an impedance matching network connected to the center tap terminal, said network configured to match the subscriber line impedance as reflected into the primary side of the transformer.

11. An automatic gain repeater system for use in a telephone transmission line subscriber loop having a subscriber to central office line and a central office to subscriber line, the automatic gain repeater system comprising:

means for connecting said automatic gain repeater system to a telephone central office;

means for connecting said automatic gain repeater system to a telephone subscriber loop;

a first controllable variable gain AC amplifier connected in series circuit arrangement with the subscriber to the central office line for amplifying telephone transmission in the subscriber to central office line;

a second controllable variable gain AC amplifier connected in series circuit arrangement with the central office to subscriber line for amplifying telephone transmission in the central office to subscriber line, each of said variable controllable AC amplifiers comprising a high gain operational amplifier having an inverting input terminal, a noninverting input terminal, an output terminal, an input circuit connected to the noninverting terminal, a variable impedance feedback circuit coupled between the output terminal and the inverting terminal, the feedback circuit comprising a fixed resistor connected between the output terminal and the inverting terminal, a zener diode coupled to the inverting terminal, a variable bias supply coupled to the zener diode for biasing the zener diode through its breakdown region thereby changing the impedance of the zener diode in accordance with the variable bias supply, the variable bias supply comprising:

means for coupling the automatic gain repeater to a master power supply; and means for adjusting the bias on the zener diodes in accordance with any fluctuations in the master power supply so that the gain of the AC amplifiers is independent of any such fluctuations;

means coupled to the central office line and to the subscriber line for delivering constant predetermined amount of power to the subscriber loop and producing thereby a signal in accordance with the subscriber loop impedance; and means for controlling the first and second controllable variable gain AC amplifiers in accordance with the signal produced by the means for delivering constant predetermined power to the subscriber loops such that the transmission loss in the subscriber loop is maintained at a predetermined level.

12. The automatic gain repeater according to claim 11 wherein the adjusting means includes amplifier means coupled between the master power supply and the zener diodes such that the bias on the zener diodes is changed in accordance with any power supply fluctuations.

13. An automatic gain repeater system for use in a telephone transmission line subscriber loop having a subscriber to central office line and a central office to subscriber line, the automatic gain repeater system comprising:

means for connecting said automatic gain repeater system to a telephone central office;

means for connecting said automatic gain repeater system to a telephone subscriber line;

at least one variable controllable amplifier means to amplify telephone transmission in the subscriber loop;

means coupled to said subscriber loop for delivering constant predetermined amount of power to the subscriber loop producing thereby a signal in accordance with the subscriber loop impedance; and means for controlling the amplifier means in accordance with the signal produced by the means for delivering constant predetermined amount of power such that the transmission loss in the subscriber loop is maintained at a predetermined level.

* * * * *

UNITED STATES PATENT AND TRADEMARK OFFICE
CERTIFICATE OF CORRECTION

PATENT NO. : 4,277,655
DATED : July 7, 1981
INVENTOR(S) : Ronald J. Surprenant

It is certified that error appears in the above—identified patent and that said Letters Patent is hereby corrected as shown below:

Column 3, line 38, "31 48 V" should read "-48 V".

Column 8, line 9, "reponds" should read "responds".

Signed and Sealed this

Twelfth Day of January 1982

[SEAL]

Attest:

GERALD J. MOSSINGHOFF

*Attesting Officer*   *Commissioner of Patents and Trademarks*